(12) United States Patent
Mayerle

(10) Patent No.: US 11,547,045 B2
(45) Date of Patent: *Jan. 10, 2023

(54) CUTTING BLADE

(71) Applicant: Dean Mayerle, Saskatoon (CA)

(72) Inventor: Dean Mayerle, Saskatoon (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 14 days.

This patent is subject to a terminal disclaimer.

(21) Appl. No.: 17/398,382

(22) Filed: Aug. 10, 2021

(65) Prior Publication Data

US 2021/0360851 A1 Nov. 25, 2021

Related U.S. Application Data

(63) Continuation of application No. 16/255,455, filed on Jan. 23, 2019, now Pat. No. 11,172,611.

(60) Provisional application No. 62/686,438, filed on Jun. 18, 2018, provisional application No. 62/626,205, filed on Feb. 5, 2018.

(51) Int. Cl.
*A01D 34/73* (2006.01)
*B21D 53/64* (2006.01)

(52) U.S. Cl.
CPC .......... *A01D 34/73* (2013.01); *B21D 53/647* (2013.01)

(58) Field of Classification Search
CPC .................. A01D 34/73; B21D 53/647
See application file for complete search history.

(56) References Cited

U.S. PATENT DOCUMENTS

| 4,304,978 | A | * | 12/1981 | Saunders | C21D 1/09 219/121.85 |
| 5,906,053 | A | * | 5/1999 | Turner | C21D 9/18 30/353 |
| 6,857,255 | B1 | * | 2/2005 | Wilkey | A01D 34/13 56/296 |
| 2006/0168933 | A1 | * | 8/2006 | Hill | A01D 34/73 56/295 |
| 2006/0213342 | A1 | * | 9/2006 | Turner | A01D 34/73 83/13 |
| 2007/0163128 | A1 | * | 7/2007 | Tarrerias | C23C 26/02 30/350 |
| 2009/0095214 | A1 | * | 4/2009 | Whitfield | B05B 7/228 118/50.1 |
| 2009/0322143 | A1 | * | 12/2009 | Krauter | E21C 35/18 299/105 |

(Continued)

*Primary Examiner* — Abigail A Risic
(74) *Attorney, Agent, or Firm* — Adrian D. Battison; Ade & Company Inc.; Ryan W. Dupuis

(57) ABSTRACT

A cutting blade for vegetation is provided for example for use in a straw chopper or rotary mower. The blade includes a first base material and a plurality of hard surface beads of at least two different materials formed on at least one surface of the base material extending up to a cutting edge of the base material wherein the plurality of hard surface beads lie alternately side by side with touching side edges and one contains at least one different material of a different hardness relative to the other so that differential wear rates are created, and a wear profile is controlled. The softer material is burnt away at the edge by the cladding laser to form pockets so that the blade is serrated by the pockets when supplied with additional wear increasing the pockets to maintain the serrations.

21 Claims, 11 Drawing Sheets

(56) References Cited

U.S. PATENT DOCUMENTS

| | | | | |
|---|---|---|---|---|
| 2013/0091704 A1* | 4/2013 | Nebesni | ............... | B23K 26/14 |
| | | | | 29/889.1 |
| 2013/0111863 A1* | 5/2013 | Johnson | ............... | A01D 34/736 |
| | | | | 56/10.1 |
| 2013/0233145 A1* | 9/2013 | Sotelo | ............... | A01D 34/73 |
| | | | | 83/835 |
| 2014/0045562 A1* | 2/2014 | Adamczyk | ............... | A01F 29/02 |
| | | | | 427/256 |
| 2014/0072438 A1* | 3/2014 | Bruck | ............... | B23K 26/082 |
| | | | | 416/223 R |
| 2014/0130473 A1* | 5/2014 | Augustine | ............... | C23C 24/106 |
| | | | | 56/16.7 |
| 2015/0217414 A1* | 8/2015 | Luick | ............... | B23K 26/32 |
| | | | | 428/213 |
| 2015/0319922 A1* | 11/2015 | Stoffel | ............... | A01D 34/81 |
| | | | | 56/14.7 |
| 2015/0319923 A1* | 11/2015 | Stoffel | ............... | A01D 34/661 |
| | | | | 427/596 |
| 2016/0073582 A1* | 3/2016 | Stoffel | ............... | B23K 26/34 |
| | | | | 219/76.1 |
| 2016/0157423 A1* | 6/2016 | Stoffel | ............... | A01D 34/73 |
| | | | | 219/76.1 |
| 2016/0309648 A1* | 10/2016 | Stoffel | ............... | B23K 26/0006 |
| 2016/0360695 A1* | 12/2016 | Klackensjö | ............... | A01D 34/736 |
| 2017/0254643 A1* | 9/2017 | Telliard | ............... | G01C 9/06 |
| 2017/0325401 A1* | 11/2017 | Chang | ............... | A01D 34/73 |
| 2018/0064026 A1* | 3/2018 | Ishikawa | ............... | B29C 43/226 |
| 2020/0267897 A1* | 8/2020 | Burböck | ............... | A01D 25/005 |
| 2021/0084814 A1* | 3/2021 | Ho | ............... | A01D 34/736 |

* cited by examiner

CUTTING BLADE

This application is a continuation of application Ser. No. 16/255,455 filed Jan. 23, 2019 and now issued on Nov. 16, 2021 to U.S. Pat. No. 11,172,611.

This application claims the benefit under 35 USC 119 (e) of Provisional application 62/626,205 filed Feb. 5, 2018 and of Provisional application 62/686,438 filed Jun. 18, 2018, the disclosures of which are incorporated herein by reference.

This invention relates to a cutting blade for vegetation for example for use in an apparatus for chopping and discharging straw from a combine harvester, in a rotary mower or other arrangement in which a free blade is rotated to cut into crop material.

BACKGROUND OF THE INVENTION

Many cutting machines use different styles of cutting blades most of which are free to pivot about their mounting hole. The blades operate in abrasive environments cutting residue, and wearing out quickly. Corn headers utilize cutting blades as shown in U.S. Pat. No. 8,402,727. Forage mowers utilize blades as shown in U.S. Pat. No. 8,307,620. Blade mowers utilize large swinging blades as shown in U.S. Pat. No. 5,626,007. Flail mowers use blades as shown in U.S. Pat. No. 7,930,872. Also the present invention relates to arrangement which use fixed chopper blades rather than pivoting such as shown in U.S. Pat. No. 7,553,225.

Combine harvesters harvest cereal grain crops, such as wheat, oats, rye, barley, corn, soybeans and flax. Grain and straw are separated in a combine harvester. Following the separation process, waste straw and chaff is supplied to a chopper for shredding and distributing back over the field in an even spread pattern.

In U.S. Pat. No. 6,840,854 issued Jan. 11 2005 of Redekop is disclosed an apparatus for chopping and discharging straw from a combine harvester of the type which includes a plurality of blade members mounted on a hub for rotation about an axis of the hub with the blade members being arranged at spaced positions along the length of the hub substantially in radial planes of the hub so as to pass adjacent a plurality of axially spaced stationary blades again arranged in radial planes of the hub. The straw and other material discharged from the combine is fed into one side of the housing of the apparatus onto the hub and the material is carried around by the hub past the stationary blades in a chopping action. The material is then discharged from a discharge opening in the housing onto a tail board with spreading fins for spreading across the field.

A straw chopper, for example that in the above patent, typically contains blades carried on a rotor and stationary blades carried on the housing to cut the residue. During operation of the knives and particularly the knives of the rotor, the cutting edges wear out, which leads to a deterioration of the chopper operation, a change in the flow of the straw, reduced flow velocities and, at worst, a blockage of the chopper.

Different variations of chopper knives are known in the art. For instance, some arrangements of chopper knife can have two opposite cutting edges. This has the advantage that the knife can be inverted in case of wearing-out of a cutting edge oriented in the direction of rotation, thereby roughly doubling its lifespan.

In most cases the knife is mounted as a flail pivotally on a bushing or pin carried on the rotor so that the knife or blade is free to rotate relative to its mounting on the rotor. This allows the blade to recoil under impact and also helps to maintain balance of the rotor as the rotor rotates carrying a multitude of the blades arranged in an array around the axis of the rotor.

Thus for example the above patents show rotor blades which are defined by blades formed from a single flat sheet of metal which moves generally in the plane of the sheet where the front and rear edges are both sharpened.

In addition, as shown in the same patent, some blades may have a transverse portion out of the cutting plane for the purpose of acting as a fan blade to generate increased air flow. In this case only the front edge is sharpened.

In both cases the blade has a hole through a simple flat sheet portion of the blade at right angles to the plane of the sheet which defines a receptacle for the mounting bushing or pin.

Often farmers cut crop very close to the ground, incorporating dirt and rocks into the crop that is being fed into the combine. If the dirt is abrasive, this rapidly increases wear rates of the straw chopping blades.

The disclosures of all patents mentioned herein are incorporated herein by reference or may be referenced for further details not disclosed herein.

Sharpness of the cutting blades has a great effect on the power consumption of cutting blades in agricultural machines. Studies have shown that 50% of cutting power can be reduced by changing from a worn blade to a new blade. In a combine harvester a residue management system may use up to 25% of the total power required for the machine. If the crop can be cut more efficiently, the amount of fuel consumed can be reduced and the harvesting capacity of the combine can be increased.

Cutting blade wear can become dull very quickly depending on field conditions. Soil type in the fields often has the greatest effect on wear, as a heavy rain can cause soil to be present on plant material. If a crop to be harvested is laying down on the ground often a significant amount of soil enters the harvester and is discharged through the cutting blades of a residue management system. A sandy soil often creates a very quick wear on the cutting blades as compared to a heavy clay soil.

Redekop Manufacturing, manufacturers of straw choppers for combine harvesters, introduced a self-sharpening residue cutting blade in 2004, with the goal of providing a better cutting blade with a longer blade life. The blade consisted of a base material formed and ground into the physical shape of a cutting blade with straight cutting edges on each side. A hard surface coating was sprayed on to one side of the blade prior to heat treatment. The heat-treating process both hardened the blade and fused the coating onto the blade surface. Heat treatment of the material produced a hardness of 45-49 HRc, and a very tough blade capable of severe impacts without fracture of the blade. The hard surface coating was spray fused with a compound containing tungsten carbide particles and a nickel based fusing agent to produce a final coating hardness of 65-75 HRc, in the thin coating layer not more than 0.030 inch thick. The coating was placed on one side of the cutting blade and was designed in a triangular pattern to optimize the location of the pattern on the cutting blade in the most cost-efficient pattern. Unfortunately, application of the coating and heat treatment of the blade after shaping of the cutting-edge lead to the sharp edge of the blade curling slightly resulting in an initial cutting surface that is not very sharp.

After an initial wear in period, due to the difference in the hardness between blade and the coating, the softer parent material would wear away quicker than the hard surface coating leaving a sharp edge for the life of the blade. Contact with objects other than vegetation would often crack and chip the thin coating edge leaving an uneven edge that would again re-sharpen with more wear. These blades remain widely used by many different companies today.

Serrated residue cutting blades have been used for many years with the advantage of creating a better cut. This is done by creating more cutting surfaces at differential angles to create a disruption of flow over the cutting edge creating more cuts in the vegetation. Serrated blades are typically more expensive to manufacture because they involve grinding the blade after heat treatment to preserve a very sharp cutting edge and also include a secondary step—the grinding of the serrations typically at an angle different than the cutting-edge angle.

Cutting performance of serrated blades in the field is initially very good, as the blades are razor sharp to start with, however the life of the blades is short. Once the sharpness of the cutting edge or in the root of the serration is lost the cutting performance significantly drops and the blades must be immediately replaced.

Attempts have been made to combine the two technologies; adding a thin hard surface coating to a serrated blade, however the heat treatment and bonding of the coating on the blade results in a rolled cutting edge that is not sharp and does not produce any advantage over a coating on a straight cutting edge. It is impractical to grind the blade edge or serrations after the coating has been bonded due to the hardness of the coating being a similar hardness to the grinding or cutting tools.

Advancements in laser surfacing or laser cladding machinery have provided more options to hard surfacing. Speed and usability of the machinery have led to the commercial application of hard surfacing on small value parts. These machines provide a one pass high tolerance deposition and melting of hard surfacing powders by a laser beam. Laser cladding enables a higher ratio of hard particles to binder alloy than was previously possible with thermal spray technology. Efforts to improve cutting blades have been attempted by providing a serrated cutting edge with hardened laser clad beads forming a bump extending form the leading edge. This type of solution is described in U.S. Pat. No. 7,677,843, however various drawbacks and inefficiencies exist in this approach and has not become commercially acceptable.

A second effort is disclosed in U.S. Pat. No. 9,686,911. In this invention small clad beads extend from a straight cutting edge of a blade transversely to the center of the blade. As the blade's cutting edge wears it creates pockets between the laser clad strips that are similar shaped to a cut or ground blade serration. This provides a longer life to the blades, and some enhanced cutting. However the roots of the pockets become very dull and rounded and therefore not desired in conditions demanding the best residue cut.

SUMMARY OF THE INVENTION

According to a first aspect of the invention there is provided a blade for mounting on a rotor of a cutting machine for cutting vegetation, the blade comprising:
a blade member comprising a first base material;
at least one cutting edge on the blade member;
side by side strips of cladding material applied to the blade member so as to extend from a position at the cutting edge along the blade member in a direction transverse to the cutting edge;
wherein the cladding material is of a greater hardness than the first base material;
and wherein at least one of the strips of cladding material has greater resistance to wear than others of the strips.

The different wear characteristics of the strips can be provided by providing cladding materials of different thicknesses or by providing different wear characteristics in the material themselves.

According to a second aspect of the invention there is provided a blade for mounting on a rotor of a cutting machine for cutting vegetation, the blade comprising:
a blade member;
the blade member comprising a first base material;
at least one cutting edge on the blade member;
a plurality of side by side strips of cladding material applied to the blade member so as to extend from a position at the cutting edge along the blade member in a direction transverse to the cutting edge;
wherein the strips are parallel and have side edges of each strip immediately adjacent a side edge of a next adjacent strip.

Preferably in the arrangements defined above, the first and second cladding materials are applied as a bead. That is they form a strip of constant width with a starting point at the edge and extending across the blade toward but not necessarily up to a center line of the blade member. The strip or bead is typically straight but can have a curvature.

Preferably the first and second cladding materials are applied as parallel straight beads and arranged so that the first and second cladding materials alternately intersect the cutting edge to form harder and softer regions along the cutting edge.

In this arrangement it is particularly desirable that the first and second cladding materials are arranged directly side by side so that no part of the base material is exposed between the materials at the cutting edge. This avoids the crop engaging any part of the parent material at the edge which will form a blunt or curved section at the edge when wear has occurred.

Preferably the blade member is formed of a flat plate of constant thickness but can be stamped or otherwise formed so as to be of different thicknesses. In such a blade, the blade member typically has one flat surface and one chamfered surface converging toward the flat surface at the cutting edge. In this arrangement the first and second cladding materials are applied on the flat surface so that they are located at the cutting edge and do not encroach onto the chamfered edge. In one embodiment where the cutting edge is not serrated, the chamfered surface is flat and lies at a constant angle to the flat surface.

In another embodiment, the chamfered surface is serrated to form a series of serrations along the cutting edge and extending at an angle to the cutting edge. The serrations are ground at an angle different than the chamfered surface and can be profiled at right angles to the cutting edge but more typically are inclined from the cutting edge at an angle of the order of 65 degrees away from the end of the blade. In one example the serration is defined at 27 degrees while the bevel is 24 degrees.

In one example the serrations are cut at a different angle to the blade bevel so that the "cutting surface" of the serration which is the long edge of the serration. In this way a piece of straw sliding down the blade edge from the hole to the tip of the blade, as it encounters a serration, it drops into the pocket and the long edge of the serration creates a new angle, a directional change to grab the straw and cut it.

In this arrangement, typically the first and second materials are applied onto the bottom surface so that they are inclined to the cutting edge at the same angle as the serrations and perpendicular to the cutting edge of the serration.

In this arrangement, preferably the serrations comprise a plurality of parallel ribs with a valley between each rib and the next and the first harder material is located on the flat bottom surface as a series of beads each at a position and angle aligned with a respective one of the ribs and the second material of lower hardness is located on the flat surface as a series of beads each at a position and angle aligned with a respective one of the valleys. The first and second materials are therefore alternate along the blade edge. As the softer material wears more quickly, this maintains the valley structure of the serrations.

Typically each of the materials has a common thickness in the range 0.005 to 0.030 inches. However different thicknesses can be used in some cases particularly for the softer material so that it wears more quickly to maintain the valleys of the serrations.

Thus for example, another way to achieve the require different wear characteristics is to use the same cladding material, applied in the same pattern, but alternating in different thicknesses, where you want the blade to last the longest apply the clad material 0.020 thick and in the roots of the serrations applied 0.005 thick, thus creating a differential rate wear pattern. In effect therefore the arrangements herein act to create differential wear rates with the coating to create a sharp serrated pattern, and also controlling the worn shape.

Preferably each of the materials is laser clad so that each of the materials comprises a bead of powder which is fused to the base material by laser heating. However other cladding methods can be used.

In most cases there are only two different materials alternating between hardest and softer. However in some cases additional materials can be used, where all are different from the parent material.

In this arrangement, the materials are arranged and applied so that the second material wears more quickly than the first material and thus generates the self-sharpening serrated effect required.

In order to avoid the parent material being exposed at the cutting edge, it is preferred that the first and second materials form beads which have side edges which touch. However in some cases a small space may be made due to the application method provided that this does not generate an area of blunt parent material which is sufficient to interfere with the cutting action.

Typically the angle of clad beads is in the range 45 to 75 degrees to the cutting edge.

Preferably an end portion of the surface of the blade is clad on the bottom surface with the first material so that the outermost flat edge which engages the crop material is of the hardest possible structure to reduce wear at this important area. In this construction typically the blade member has a transverse flat outer edge with the cutting edge extending from the outer edge along one side of the blade member.

Preferably the beads are applied so that the beads are longer at the end of the blade member than at a position spaced from the end of the blade member. This allows the use of a minimum of the cladding material to reduce cost.

The blades are typically used in a chopper and discharge apparatus arranged to be mounted at the rear discharge of a combine harvester for receiving the straw and/or chaff from the combine harvester and for discharging the materials from the combine harvester, the apparatus comprising:

a housing having a feed opening into which straw and/or chaff can be fed from the combine harvester and a discharge opening through which the chopped materials are discharged;

a chopping assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge. However other uses are possible such as in a rotary mower.

In the chopper, preferably the chopping assembly comprises a center chopping section and two end fan sections, the blade members in the center chopping section and the two end fan sections being arranged such that an air flow generated thereby is driven radially outwardly by the blade members so as to exit from the housing radially outwardly from the blade members through the discharge opening, the blade members in the center chopping section being substantially all cutting blade members, the blade members in each of the fan sections being substantially all fan blade members each of which includes a fan blade portion arranged to extend outwardly to at least one axial side of the radial plane so as to generate an increased air flow relative to said cutting blade members.

Preferably the chopping blades are formed from a single flat sheet of metal defining the plate where the front and rear edges of the plate are both sharpened to allow reversal when the first edge is worn.

However in some cases the fan blades blade each have a transverse portion bent out of a plane of the plate where only a front edge of the plate is sharpened for use as a fan cutting blade.

It is also possible to use the method herein to form both hard clad surfaces and a serrated edge in a single action without the necessity to carry out grinding of serrations into the hardened base material.

That is, when applying the coating the energy generated by the laser in the cladding application acts to create the start to a serration on a straight edged blade. This can be done by controlling certain parameters such as the power, laser focal point and speed of movement of the laser cladding machine. There is a significant amount of power and heat created when applying a clad bead. Both the blade and clad material are melted by the laser during the application and are bonded at a molecular level. In this way, as the edge of the blade is approached using the laser cladding system, if the power is on a high setting, or continues with a high power setting, as the parent material is thinning out as the heat approaches the beveled or chamfered edge, the laser acts to burn through and thus create a pocket or scallop at the edge which acts as a start to the serration.

The same cladding material can be applied to form both strips of a side by side two strip system in different passes and changing the power setting to increase the power in the one pass relative to the other to burn off some of the carbide to end up with a lower carbide concentration in the final clad matrix and at the same time burning off the edge of the blade to create the serration start.

That is, differential wear rates can be obtained by changing the final carbide concentration in the matrix of the same material by changing the power setting during the laser cladding process.

That is creation of a serrated edge can be obtained by burning off the edge of the parent material when applying the clad material. This can also be achieved as separate steps of the same setup where the laser cladding machine can cut the edge then coat if necessary. In this way the area between the strips can be defined by the base material or by a second less hard cladding material.

Thus, one bead of the alternate pairs of beads contains a higher concentration of carbide in the matrix which is preferably of the order of 60%, and the other bead contains a lower concentration of carbide which can be of the order of 40%. This is obtained because the application of the second bead is carried out with increased laser application power. Steps can also be taken to eliminate the harder 60% carbide bead from burning through at the blade edge so that any pocket formed thereby is much shallower than that of the softer material. These blades are as sharp as a ground serrated blade due to the application of the laser clad beads.

Also disclosed herein is a method for forming a blade for mounting on a rotor of a cutting machine for cutting vegetation, the blade comprising:

forming on a blade body of base material at least one chamfered cutting edge portion on the blade body where the blade body tapers to an edge of the blade body;

applying a plurality of strips of cladding material to the blade body so as to extend on the blade body in a direction transverse to the edge;

the strips extending between an end of each strip at a position at the edge and an end of the strip remote from the edge;

the strips being spaced each from the next at positions along the edge;

wherein the chamfered cutting edge is of a greater wear resistance or greater average hardness of the material at the spaced strips than at locations between each strip and the next;

and applying a heating action to the locations between each strip and the next so as to burn away a portion of the edge between the strip to form a recessed pocket at the edge.

The different wear resistance is typically obtained by providing different quantities of hard particles in the matrix. That is the particles themselves have the same hardness but the presence of a greater number of them in the matrix increases the wear resistance. However other arrangements for creating different wear characteristics can be used using for example particles of different hardnesses. That is, as far as starting powder selection, a number of different powders can be used or applied with differences in matrix material, hard particle types and sizes and percentages.

That is the term "greater hardness" used herein is in effect synonymous with "greater average hardness". Thus the distinguishing feature of the material can be determined by detecting an actual wear rate or by determining the greater average hardness of the material or by determining the number of hard particles in the matrix. In some embodiments the locations between each strip and the next are defined by the base material itself without application of any second bead. In this case the application of the laser energy is carried out to cut the serrated pocket in a similar procedure but without application of any cladding material.

The use of the harder material in the strips causes the recessed pockets at the intermediate locations to be deeper than a portion of the edge at the strips. Where the power, focal point and speed of applying the strips is properly controlled as the laser beam approaches the sharpened edge, the edge can remain intact while being coated. This forms a less scalloped edge where the edge is straight at the location of the harder beads and is more scalloped at the pockets between the harder strips.

In a preferred arrangement, the locations between each strip and the next is covered by a second strip having a hardness less than said first strips. The application of the higher power level at these second strips acts to vaporize some of the carbide thus reducing the finished carbide content and also acts to form deeper pockets at the blade edge. When applying the second strips, preferably the power setting from the guided laser is maintained very high so as to burn away the edge and form the scalloped pocket.

In a preferred arrangement, the width of each strip is controlled such that the clad bead most resistant to wear is narrower and the clad bead less resistant to wear is wider so that the serration pocket is also wider and the narrow clad bead wears to a sharper point on the cutting edge of blade.

Also disclosed herein is a method for forming a blade for mounting on a rotor of a cutting machine for cutting vegetation, the blade comprising:

in a blade body comprising a first base material forming at least one cutting edge on the blade member;

applying side by side strips of cladding material to the blade member so as to extend from a position at the cutting edge on the blade member in a direction transverse to the cutting edge;

wherein the cladding material is of a greater hardness than the first base material;

and wherein at least one of the strips of cladding material has greater resistance to wear than others of the strips.

The term "transverse" does not require that the angle of the strip to the edge is a right angle.

In one method herein, the different wear characteristics of the strips is provided by providing different hardnesses in the materials. That is the base material is different with more or less hardening content.

In one method the different wear characteristics of the strips is provided by providing different amounts of hard particles in the cladding material.

However more preferably, the covering material and the cladding material are formed of a common base material and are applied differentially during application to change the final carbide content of the clad bead.

Typically the heating action is applied during application of the strips by a guided laser. However other cladding systems can be used.

It is particularly important herein that the chamfered edge is flat so as to be free from ground serrations. This avoids the necessity to carry out a grinding action and then to apply a coating after the grinding is completed.

Preferably the first and second strips are applied as alternate strips. However more than two types of strips can be formed and they can be applied in different patterns if required for different hardness effects.

Preferably the two strips of cladding materials are arranged directly side by side so that no part of the base material is exposed between the materials at the cutting edge. This provides a hard surface at all part of the cutting edge without any of the softer base material being exposed.

Preferably the harder strip is narrower and the second strip is wider to create a larger serration pocket.

Where the blade member has one flat surface and one chamfered surface converging toward the flat surface at the cutting edge preferably the cladding material or materials are applied on the flat surface. However they can be applied instead on the opposed chamfered surface.

Preferably the blade has a chamfered edge, however a flat edge could be designed wear to a chamfered, serrated edge with the coating placed on one side of the blade and the clad bead application power, speed and dwell time set to create the start to the serration pocket.

The objective herein is that the second clad bead wears more quickly than the first clad bead and thus forms scalloped pockets between the strips of harder materials with the pockets formed in the application process acting to provide a serrated cutting edge as part of the formation process and not later after an extensive period of wear. Thus one objective is to provide a serrated type blade without the grinding action where the blade as supplied is already serrated without having to wait for the wear process to form the serrations. In this way the blade is sharp when first applied and remains sharp as the further wear tends to further increase the degree of the serration effect.

The term material hardness or average hardness is used herein to reference the hardness or resistance to wear of the material, bearing in mind that the material is not typically homogeneous but may have a matrix containing hard particles so that the hardness is determined by the number or type of the hardening particles. For hardness therefore the method acts really to control average hardness of the coating. The carbide particles will have a certain hardness and matrix will have a hardness lower than the carbide. Therefore when the matrix contains 60% carbide vs 40% carbide the average hardness is higher but at a micro hardness level if measured would measure either a carbide particle or the matrix particles and they would measure the same whether it is in the 60% or 40% mix. It is the average of a number of measurement to determine the "hardness" of the coating.

The arrangement herein thus provides the following features:

To create the first carbide coated serrated blade which provides advantages in cutting (over a standard carbide coated blade) and blade life (over a standard serrated blade);

To provide differential wear rates with two different materials that is softer and harder carbides where the softer carbide wears away quicker and still wears sharp in the pocket;

To apply the softer carbide was put on with higher heat so at the blade edge a starting scallop is created which is similar to a cut serration. This saves a lot of money as cutting serrations in hardened steel is very time consuming process In the present arrangement the serrations are cut with light as part of the carbide deposition process.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
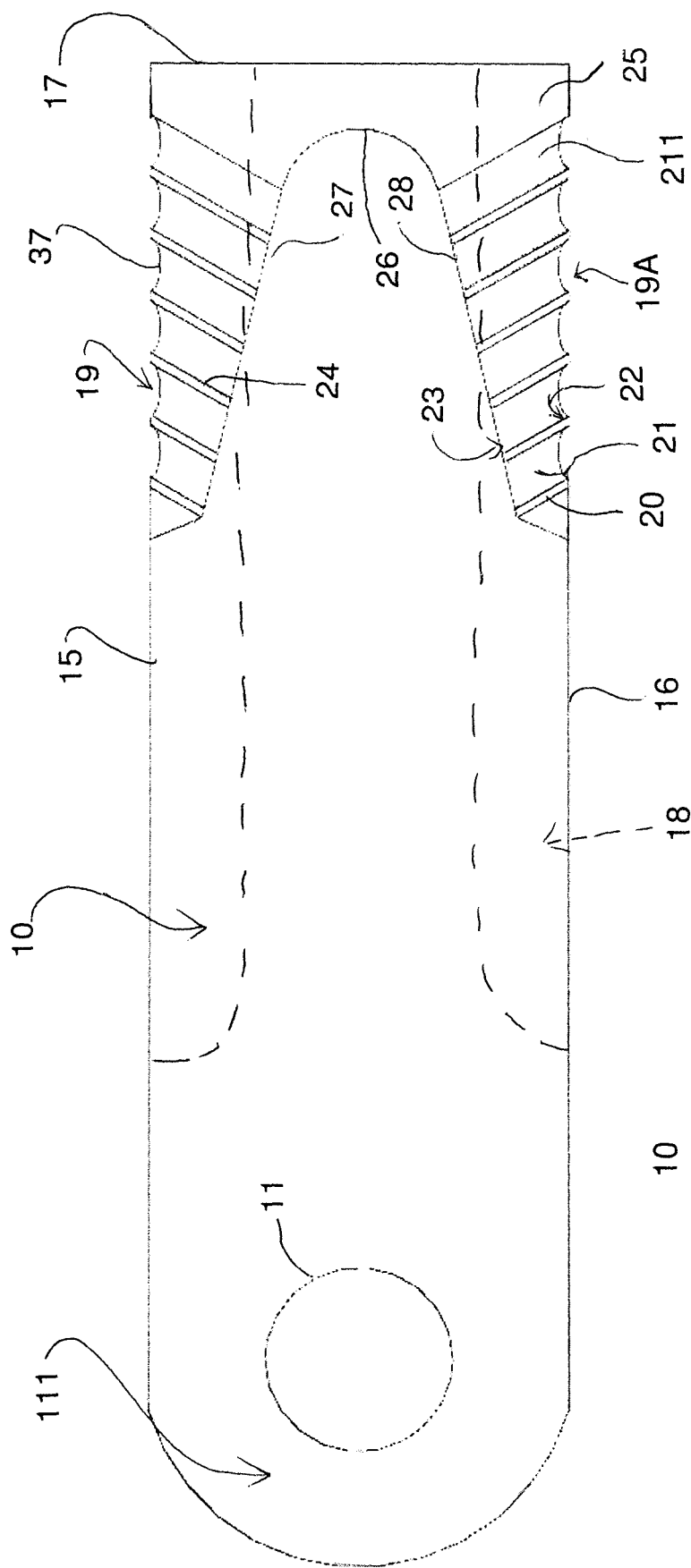
FIG. 1 is a bottom plan view of a first embodiment of self-sharpening, self-serrating cutting blade according to the invention for use in for example a straw chopper.
Figure 2:
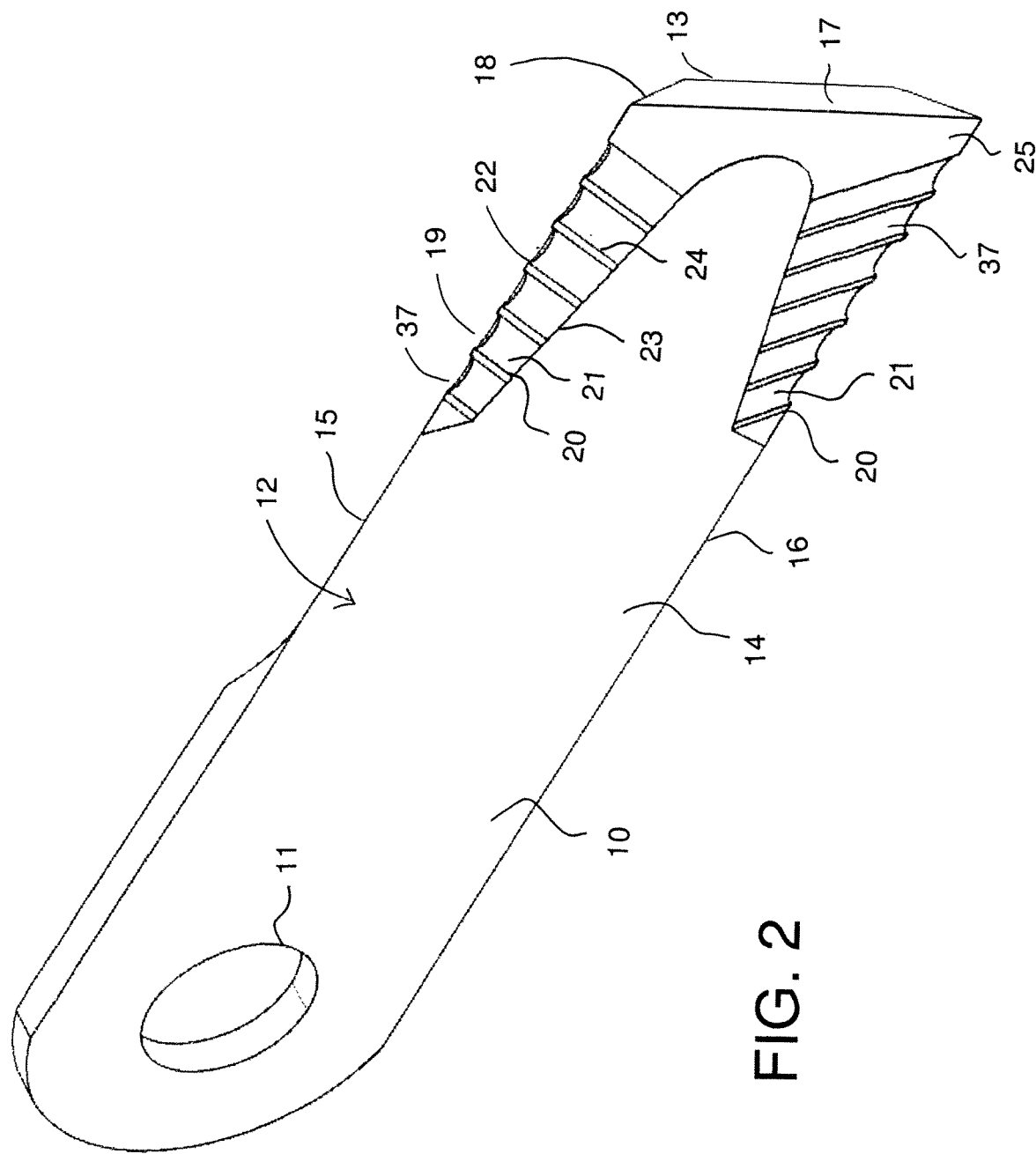
FIG. 2 is an isometric view from the bottom and outer end of the blade of FIG. 1 showing the beads of coating material applied to the bottom flat surface.

The blade herein can be used for example in the straw chopper construction of the general type shown in the prior patents of Redekop Manufacturing which are U.S. Pat. Nos. 6,840,854; 5,232,405 and 5,482,508, the disclosures of which are incorporated herein by reference.

The blade includes a plate 10 having a mounting hole 11 through the plate for mounting on a bushing carried on a pin of a rotor (not shown). While one mounting hole is shown allowing the blade to act as a flail pivotal around the axis of the mounting hole, other mounting arrangements can be provided.

The blade 10 comprises a generally flat elongate blade of a base material 12 having a top surface 13, a bottom surface 14, two side edges 15, 16 and an end edge 17. The blade is typically stamped from uncoiled strip steel rolls but other manufacturing arrangements can be used.

At least one side edge 15 or 16, and typically both side edges, is chamfered at edge 18 to form a cutting edge 19, 19A on the blade member 12 where the chamfered edge 18 is inclined from the top surface 13 to the sharp edge 19 in the bottom surface 14.

In accordance with the present arrangement, a first cladding material 20 and a second cladding material 21 are applied to the blade member on the surface 14 in parallel side by side touching strips or beads so that each strip extends from an end 22 at a position intersecting the cutting edge 19 along the blade member in a direction transverse to the cutting edge to an end 23 on the surface spaced from the edge 58.

Both cladding materials 20 and 21 are of a greater hardness than the first base material 12 and the first cladding material 20 is of greater hardness than the second cladding material 21.

Figure 4:
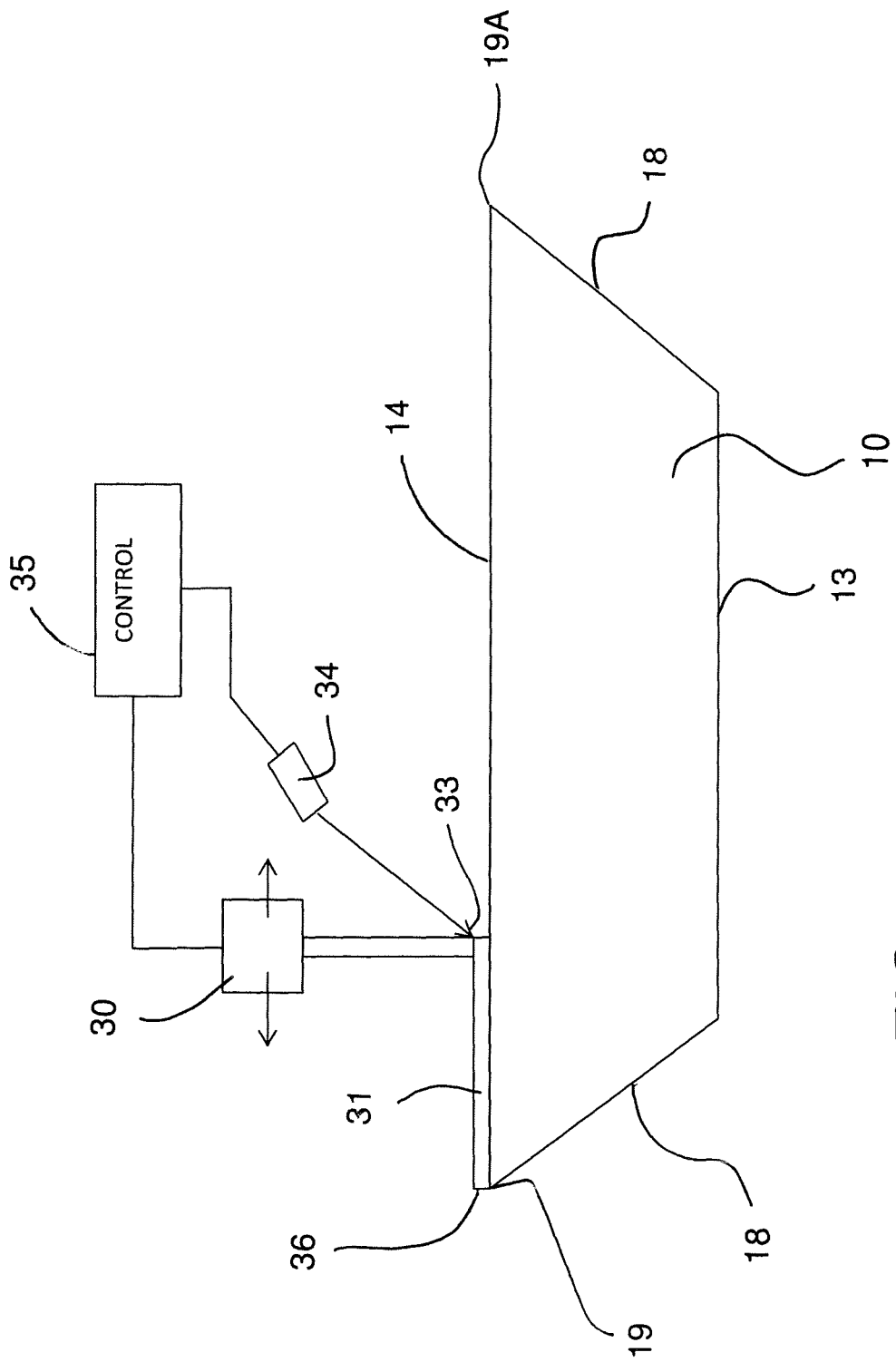
FIG. 4 is a schematic illustration of a method according to the invention of manufacturing of the embodiments of FIGS. 3 and 4.

The first and second cladding materials are applied as a bead using a CNC control system shown schematically in FIG. 4 to accurately lay down and apply the material so that the first and second cladding materials 20, 21 are applied accurately as parallel beads with touching side edges 24. The beads are applied alternately along the bottom surface 14 opposite the cutting face 13 at the end 17 and extending partly along the surface 14.

The first and second cladding materials 20, 21 alternately intersect the cutting edge 19 and lie directly side by side so that no part of the base material 12 is exposed between the materials 20, 21 at the cutting edge 19.

In FIGS. 1 to 4, the chamfered surface 13 is flat and lies at an angle to the flat surface 14 so that the blade edge when initially formed is not serrated. However serrations are formed in the cladding process and continue to form during use as explained hereinafter and as the wear operates to wear back the edge of the less hard material 21 leaving the edges at the harder material 20 less worn and therefore more pronounced.

The blade has a transverse flat outer edge 17 with the cutting edge 19, 19A extending from the outer edge 17 along one or both sides of the blade 10. The angle of the clad beads is in the range 45 to 75 degrees to the cutting edge 19 so that the parallel and touching beads 20, 21 are inclined from their ends 22 toward the end of the blade with the hole 11 and terminate at the end 23 of the beads.

This forms an end section 25 of the blade 10 which is covered by the of the harder cladding material 20' between the end edge 17 and the sides of the last portion of the second cladding material as indicated at 211. This section 25 shown in FIG. 1 is coated with the first harder material 20 so that this part is maintained at the lower wear condition defined by the harder material. From that point on, the materials 20, 21 alternate to form the side by side beads. The section 25 is thus defined in shape by the end edge 17, by a semicircular edge 26 and by side edges 27 and 28 which extend outwardly from the edge 26 to the outer side edges 15, 16. The side edges are inclined at the same angle as the beads which is inclined from the side edges 15, 16 at approximately 70 degrees along the blade 10 toward the end 111 with the hole 11. The semicircular edge 26 smoothly connects the inside ends 23 of the beads from one side of the blade to the other. As also shown in FIG. 1, the beads are longer at the end 17 of the blade 12 than at a position spaced from the end 17 of the blade member so that the edge 23 converges toward the edge 17 to join the semicircular edge 26. This reduces the required amount of coating material as the area at the end edge 17 is more heavily worn in the cutting action thus requiring a greater length of the cladding material than at the part of the blade remote from the edge 17 where less wear occurs.

In FIG. 4 is shown the method for forming the blade described where the blade body 10 has the flat lower surface 14 to be clad facing upwardly and the upper surface 13, having the chamfered edges 18 facing downwardly.

A supply 30 of a cladding material 31, typically in powder form, deposits a plurality of strips 20, 21 of the cladding material on to the blade body 10 so as to extend on the blade body in a direction transverse to the edge as previously described. Each strip 20, 21 is formed independently starting at the end 33 spaced from the edge 19, 18A and moves toward the edge. As the material is laid down, the material is heated by a guided laser beam from a controlled laser 34 under control of a CNC control system 35 which also controls the movement of the supply 30. Both the location, the power, and focal point of the laser is controlled so that the required amount of heat is applied to the material at the locations required. The strips 20, 21 thus extend between an end 36 of each strip at a position at the edge 19 and the end 33 of the strip remote from the edge 19.

Figure 3:
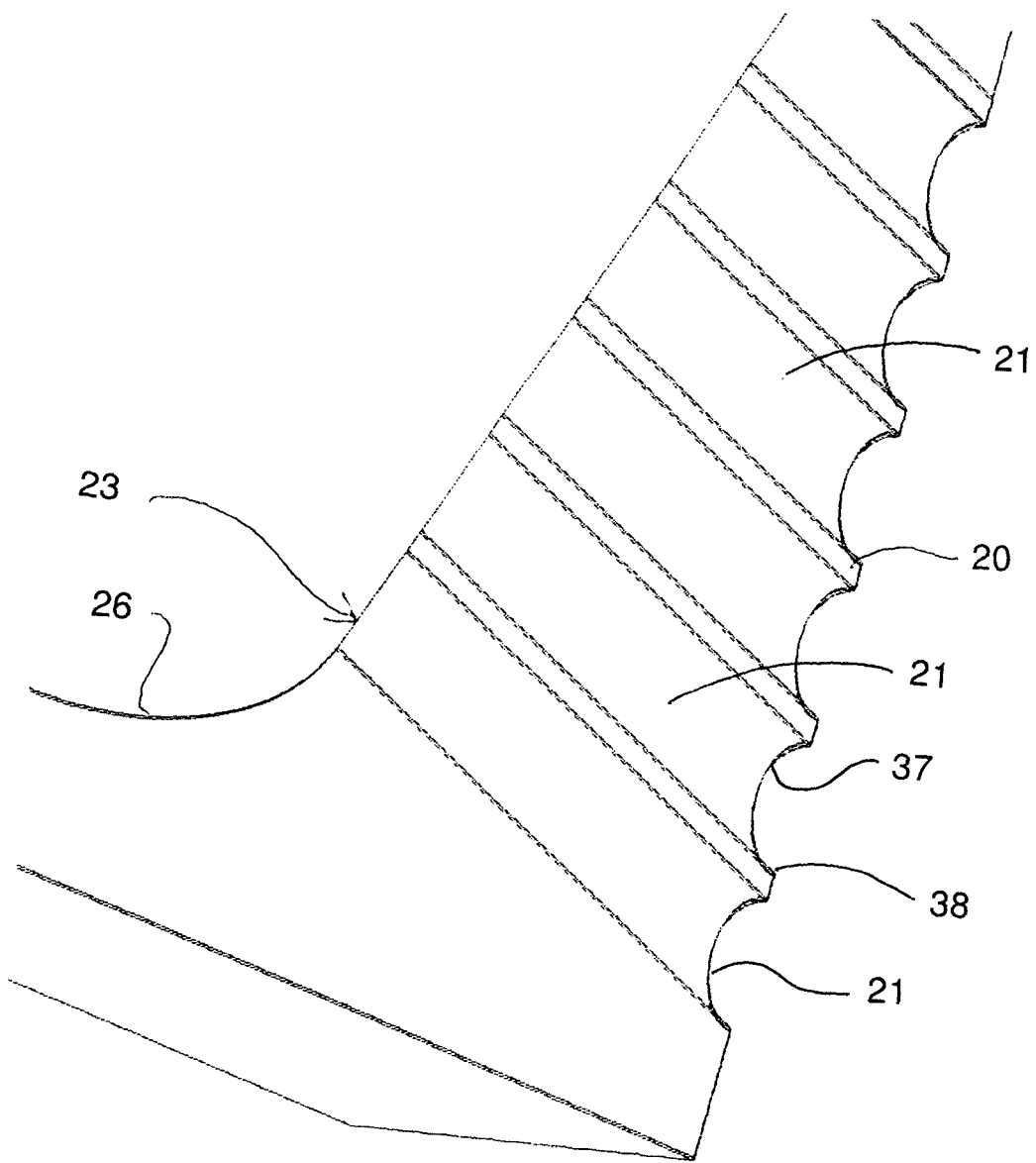
FIG. 3 is an isometric view of an edge portion of the embodiment of FIGS. 1 and 2.

As shown in FIG. 3, the system lays down a series of alternate strips including the first set of strips 20 of a first hardness and the second set of strips 21 of a second hardness. The strips 20 and 21 are directly side by side as described above.

As shown in FIG. 3 the energy applied by the laser 34 to the locations between each strip 20 and the next so as to burn away a portion of the edge 19 between the strips 20 to form a recessed pocket 37 at the edge in the area between the strips 20 defined by the strips 21.

In a preferred step in the method, an increased power is applied to the laser while applying the strips 21. This has two effects. Firstly it vaporizes some carbide from the mixture so as to reduce the hardness of the strips 21. Secondly it increases the burn effect at the edge 19 to form the pocket 37. These effects can be controlled and obtained by changing many different control parameters including but not limited to controlling the power supplied to the laser, and/or the focal point of the laser and/or the speed of movement which controls the dwell time at the edge.

Depending on the accuracy of the control, a smaller pocket may be formed at the edge 19 in the strips 20 but the recessed pockets 37 at the strips 21 are deeper than a portion of the edge 19 at the strips 20 which may be recessed to form a shallow pocket or may not be recessed at all. This forms a serrated edge as shown with cutting points 38 at the junction between the pocket 37 at the strip 21 and the remaining unburnt or less burnt part of the edge 19 at the strip 20.

In FIG. 3, the locations between each strip 20 and the next is covered by a second strip 21 having a wear rate less than said first strips 20. This difference in wear can be obtained in the process by application of the same material using different control parameters, or more preferably it can be obtained as described above by using different cladding materials.

Thus in FIG. 3, the strips 20 and 21 are directly side by side and at least one of the strips 20 of cladding material has greater resistance to wear than others 21 of the strips.

This arrangement as shown in FIG. 3 avoids the complex expensive process for grinding of the chamfered edge with grooves or serrations so that the chamfered edge itself before cladding is flat. The serrations which assist in the cutting action are thus formed by the burned pockets 37 which are maintained as the blade wears by the difference in hardness at the strips 19 relative to the spaces therebetween. The heating action between the strips to burn the edge 19 can be provided by the laser or may be a separate operation after the cladding material in the strip 21 is applied. Alternatively another system can be used to form the pockets, which can be heating or burning or cutting or may use other processes.

The effect obtained is that the thin strip of hard material at the bottom surface continues to form a cutting edge as it and the parent material above it are worn away. As the thin clad material at the edge extends along the full edge leaving no parent material forming the edge, the full length of the edge remains sharp. As the two types of the material wear differently so that the material in the valleys wears more quickly, this material wears away from the edge more quickly to maintain the structure of the valley.

Thus in one aspect of the invention, the cutting blade is provided that includes at least one surface that is clad with at least two different types of laser clad material. One side of the cutting surface has a plurality of clad beads extending from the cutting edge transversely toward the center of the blade. The blade has a straight cutting edge. The laser clad material with the higher hardness and lowest wear rate is deposited to the edge of the cutting blade. The laser clad material with the lower hardness and higher wear rate is deposited away from the edge. The clad material is deposited in beads of alternating hardness. The blade parent material is of a third hardness which is lower than the two laser clad bead hardness values.

In the field, the blade parent material wears away quickly creating a self-sharpened cutting edge. Because alternating stripes of the laser clad beads started back from the edge 19 at the inner end 23, the parent material continues to wear back to the start of the laser clad bead at the end 23. This now self sharpens creating a serrated pocket. As foreign objects hit and chip the edge 19 or coatings 20 and 21 the blade re-sharpens and continues to cut well.

Areas of the blade that are critical for cutting such as the end corners of the blade at the junction between the edges 19, 19A and the end 17 are coated with the harder laser clad material 20 to ensure blade wear is best controlled in these areas.

This type of blade is desired by a farmer that harvests a lot of crop that is laying down on the ground or has a very abrasive soil environment. The blade when supplied with the pockets 37 already has the serrated edge which cuts best and further wear further increases the serrated shape thus further increasing cutting action. The blade is thus effective and inexpensive to produce in that it does not require convention grinding of the serrated shape.

Figure 6:
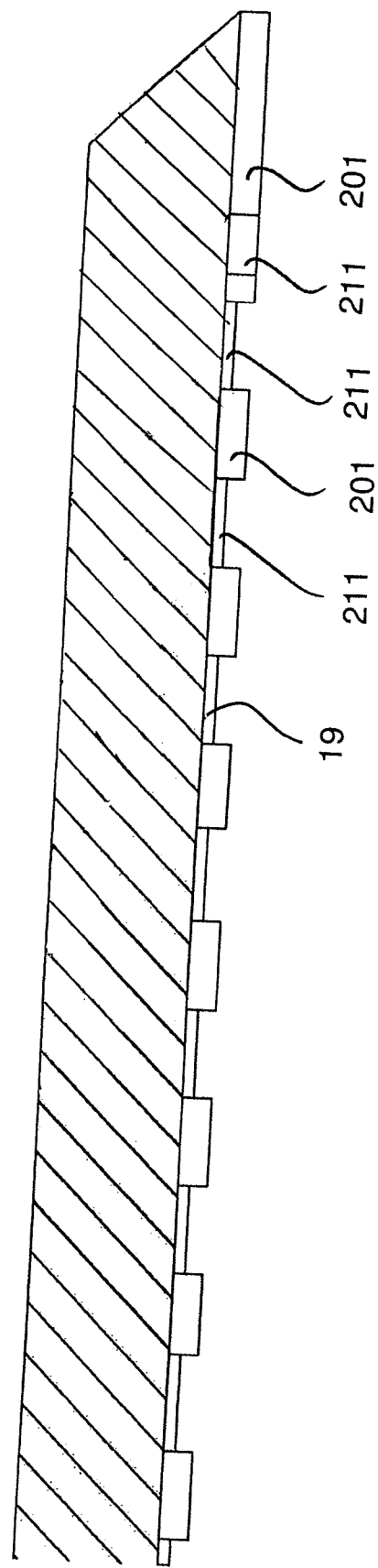
FIG. 6 is aside elevational view of a further embodiment of blade.
Figure 7:
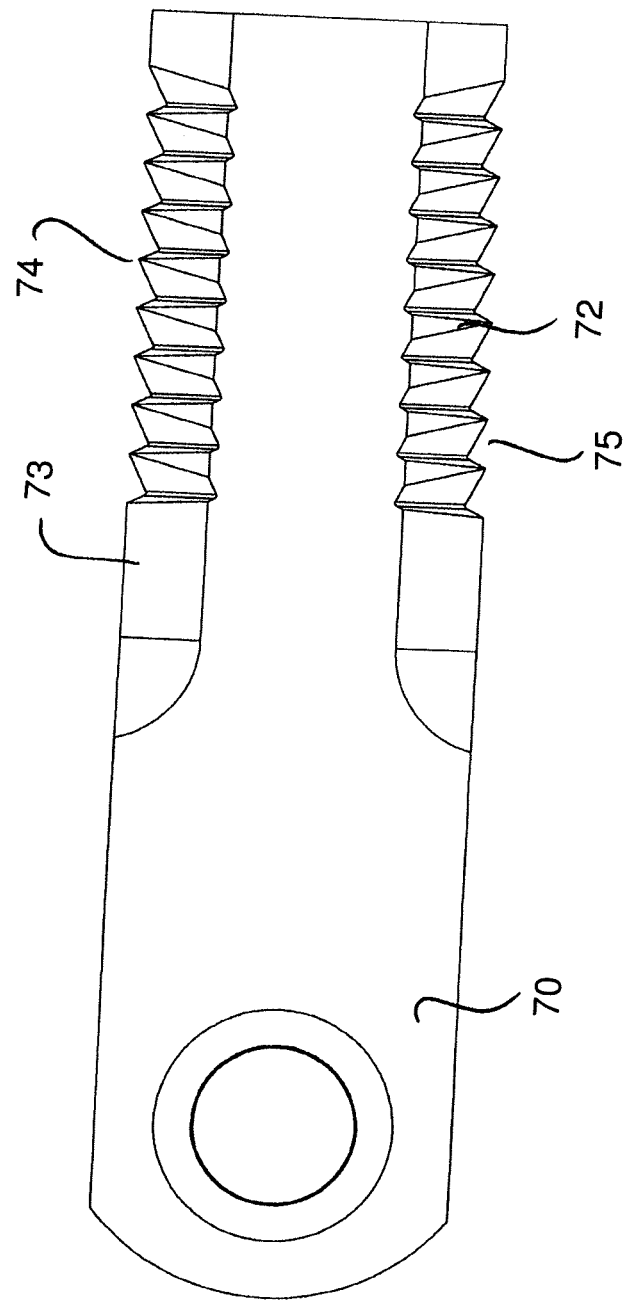
FIGS. 7 to 10 are various views of a further embodiment of self-sharpening, self-serrating cutting blade according to the invention for use in the apparatus of FIGS. 1 to 5 where the blade has a serrated cutting edge.

In a second embodiment shown in FIG. 6, the difference in the wear conditions between the two sets of beads on the cutting blade is provided by two different thicknesses of the laser clad material. In this case the same cladding material can be used but the materials also may be different. Thus in FIG. 6, one side of the cutting surface has a plurality of clad beads 201 and 211 extending from the cutting edge 19 transversely toward the center of the blade. The blade has a straight cutting edge. A laser clad material 201 with the thickest and thus lowest wear rate is deposited to the edge of the cutting blade. The laser clad material 211 with the thinnest and thus higher wear rate is deposited next to the thickest laser clad bead. The clad material is deposited in beads of alternating thickness. The blade parent material is of a third hardness with a higher wear rate than the two thicknesses of laser clad beads.

In the field, the blade parent material at the pockets 37 continues to wear thus continuing to maintain a self-sharpened cutting edge. Because alternating strips of the laser clad beads were deposited in different thicknesses, the thinnest beads 211 wear away quicker and while wearing self sharpens creating a pocket. The beads 201 thus wear less and hence provide no pocket or a pocket of reduced depth so that the edge is serrated. As foreign objects hit and chip the edge or coating the blade re-sharpens and continues to cut well.

Areas of the blade that are critical for cutting such as the end corners of the blade are coated with the thickest laser clad material to ensure blade wear is best controlled in these areas.

Figure 5:
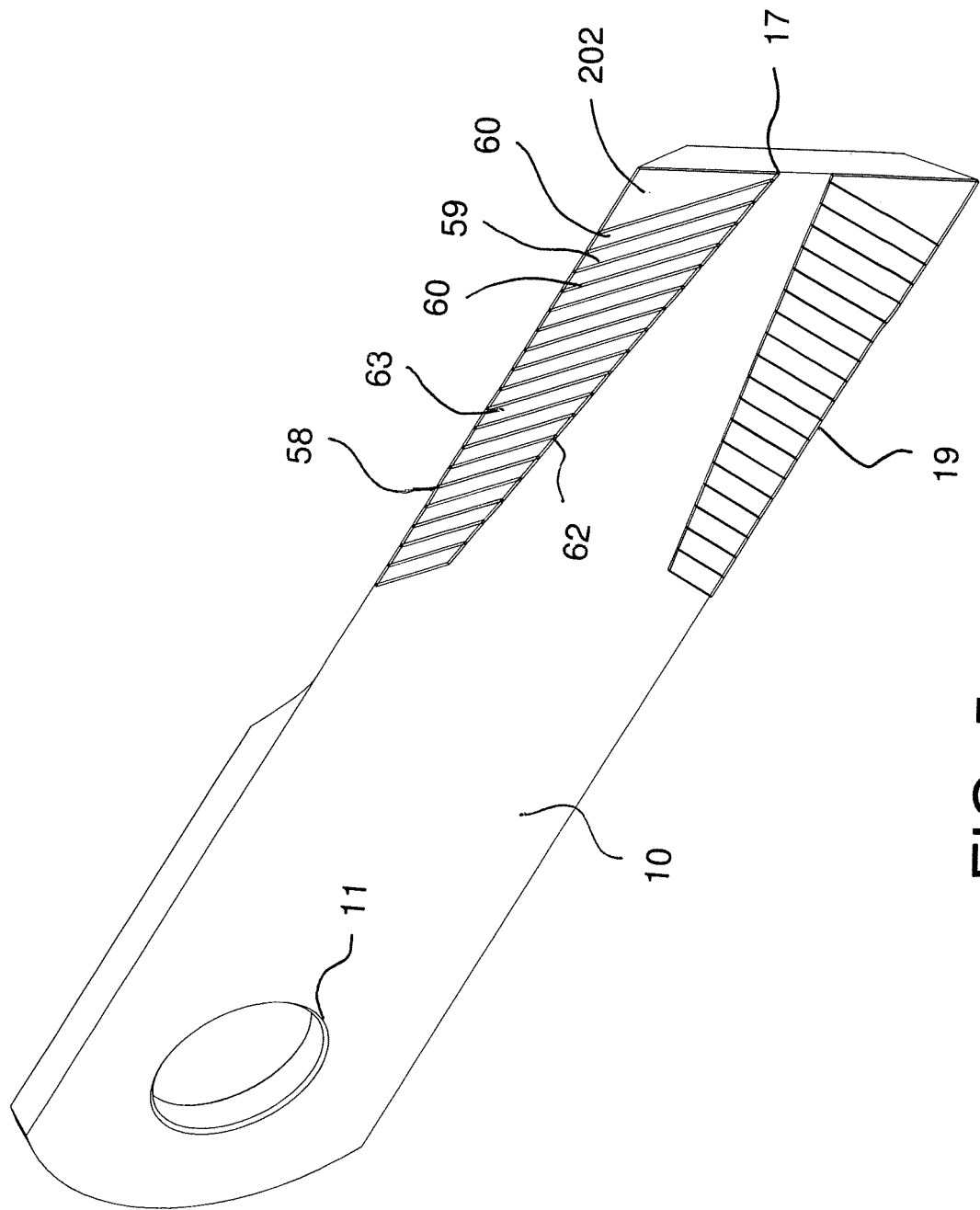
FIG. 5 is an isometric view from the bottom and end of a second embodiment of blade.

As shown in FIG. 5 is shown a further embodiment similar to that of FIG. 1 where the alternate beads 59 and 60 of harder and softer cladding materials are arranged at an angle of inclination opposite to that of FIG. 1. That is the beads start at the edge 19, extend transversely of the edge 19 toward a center line of the bade and then incline toward the end 17 rather than the hole 11. This forms end portions 202 of the harder cladding material at the end 17 which are triangular in shape but again protect the important end location against wear.

In a further embodiment shown in FIGS. 7 to 10, the blade includes a top surface 70 and a bottom surface 71. The top surface is chamfered at the side edges 72, 73 to form the cutting edges 74, 75 as before. However in this embodiment the chamfered surfaces 72 and 73 are serrated to form a series of serrations at spaced positions along the cutting edge. Each serration starts at the respective cutting edge 74 and extends at an angle to the cutting edge. Thus as shown in the top plan view of FIG. 11 and the cross-section of FIG. 12, each serration is formed by a cutting a valley 77 between each rib 76 which is triangular in cross-section to provide a top apex 78 with a valley 77 between each rib and the next.

Figure 8:
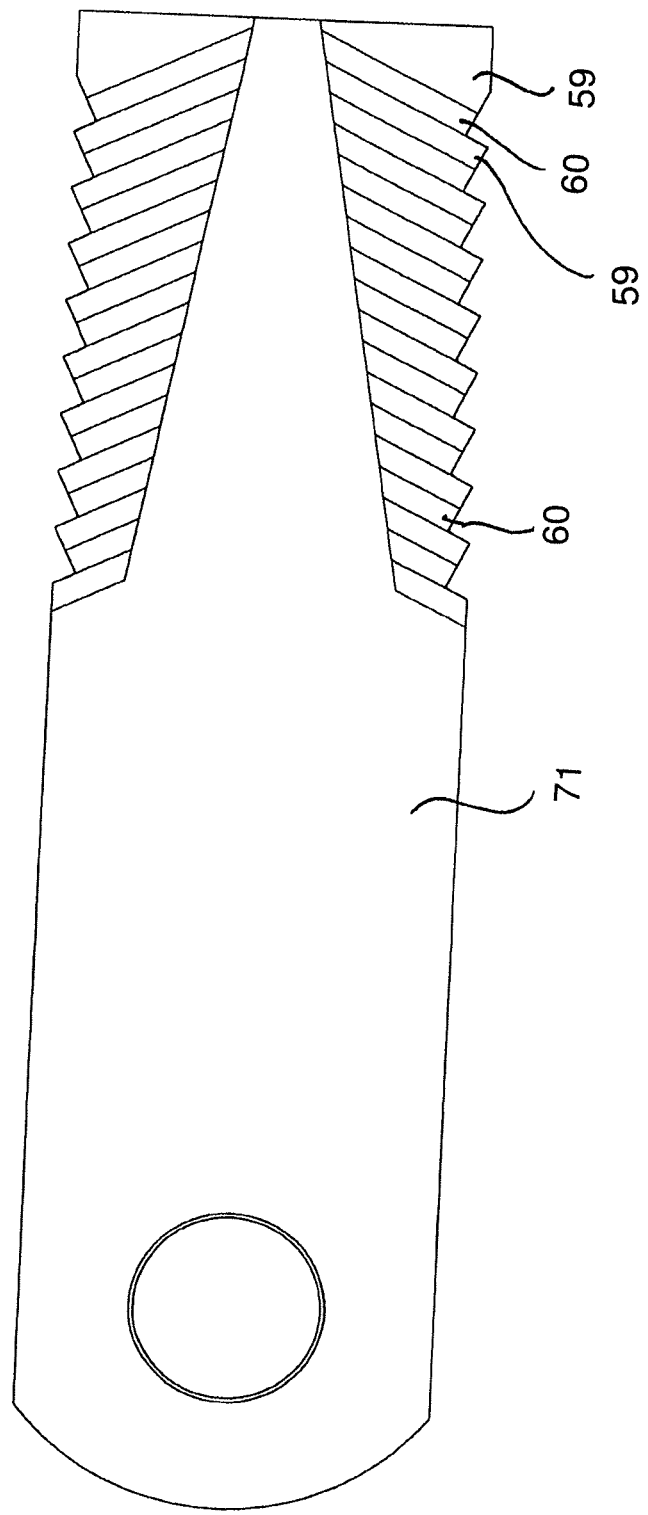
Figure 9:
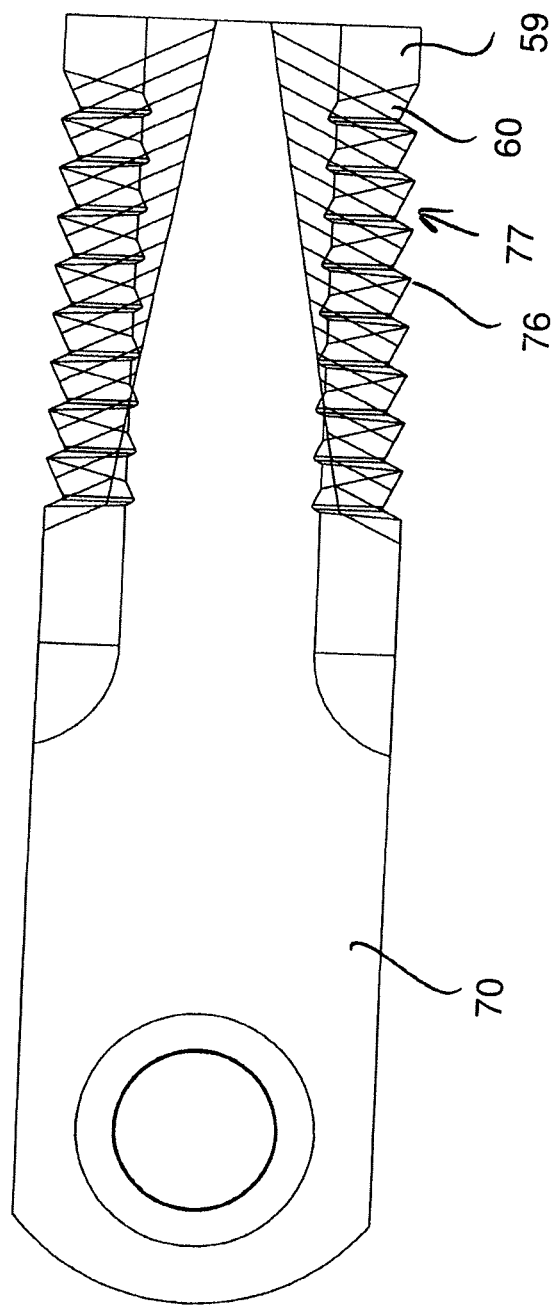
Figure 10:
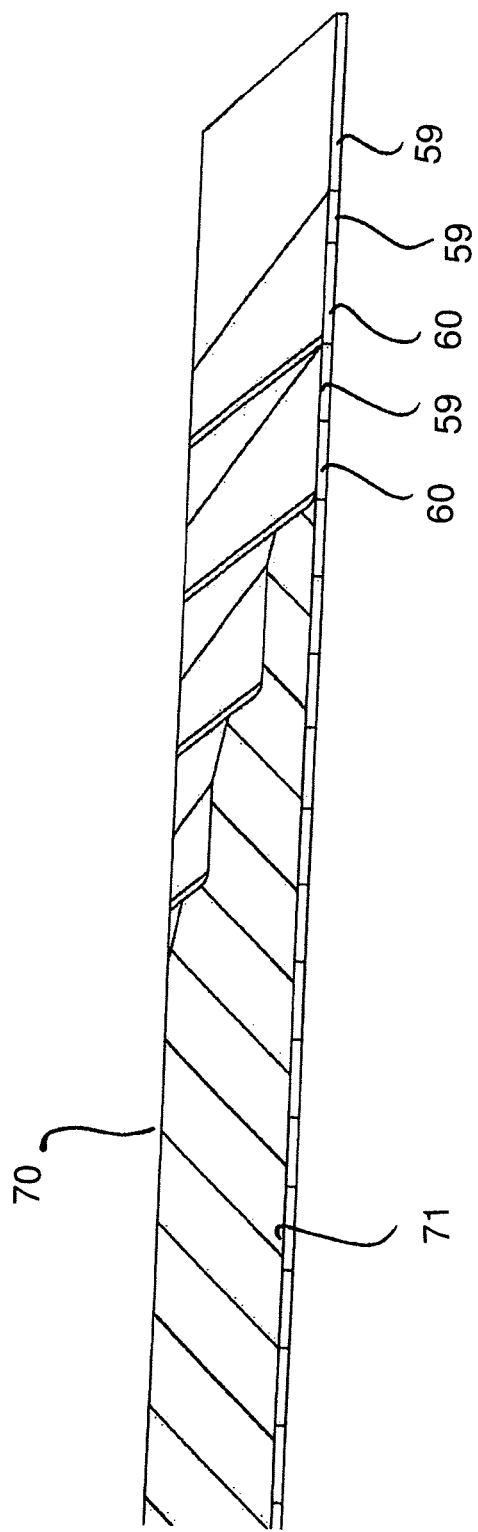

Thus the chamfered edge comprises a plurality of parallel ribs 76 with a valley 77 between each rib and the next. As shown in FIGS. 8 and 10, the beads 59 of the first harder material are located on the flat bottom surface 71 as a series of beads each at a position and angle aligned with a respective one of the ribs 76 and the second material of lower hardness is located on the flat bottom surface as a series of beads 60 each at a position and angle aligned with a respective one of the valleys 77. The angle of the serrations to the edge 74 can vary but the beads or strips of the first and second materials 59, 60 are inclined to the cutting edge 74 at the same angle as the serrations and perpendicular to the cutting edge of the serrations.

In this way as the less hard material 60 wears in the valley, this continues to maintain the valley of the serration while the sharp ribs remain as ribs by the hardest material 59.

Figure 11:
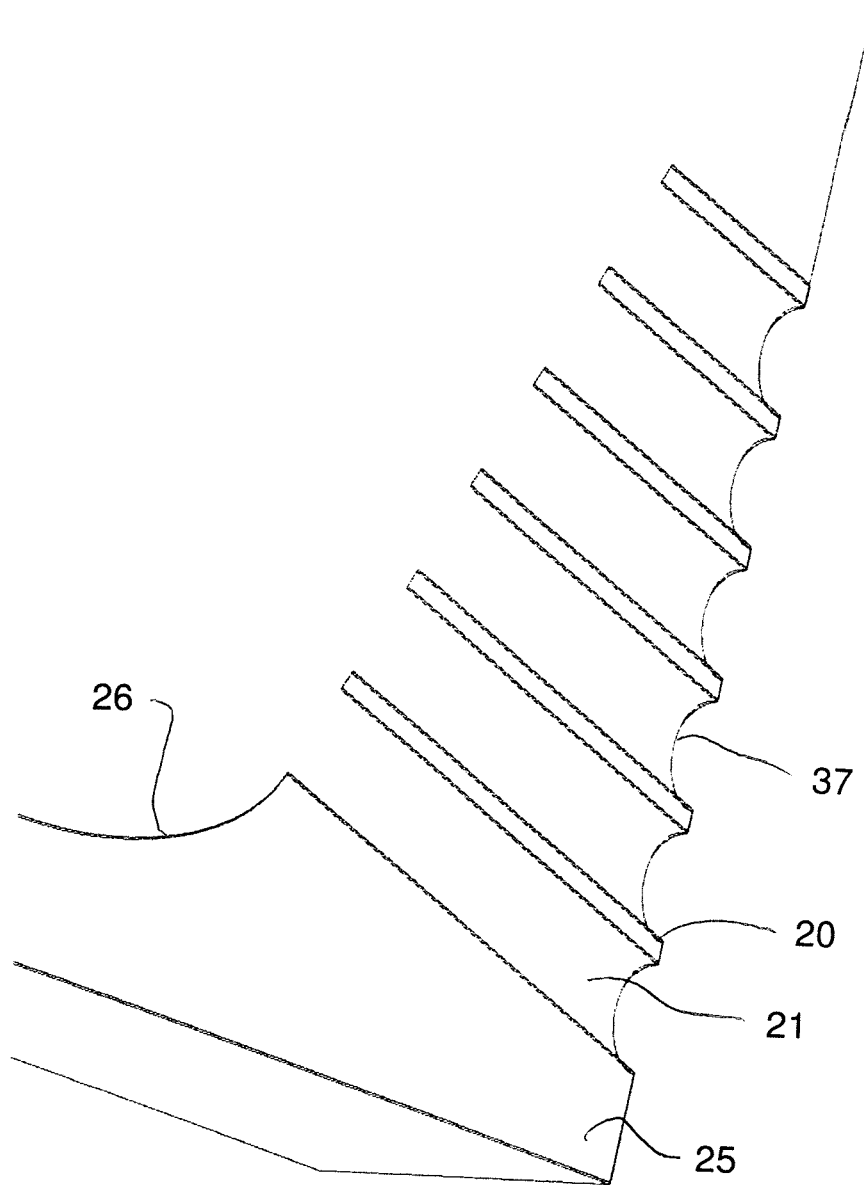
FIG. 11 is an isometric view of an edge portion of a yet further embodiment of blade similar to that of FIG. 3 according to the invention.

In FIG. 11 the strips 91 are applied as in FIG. 1 but no intervening strips 92 are applied so that between the strips 91 the parent material of the blade body forms the section between the strips 91. This is possible in the situation where the parent material is sufficiently hard.

As shown in FIG. 11, the locations between each strip and the next is defined by the base material. The application of the laser energy acts to cut the edge 83 to form the pocket 93. Whereas the edge 83 at the strips 91 has no pocket or a much smaller pocket.

Thus as shown, the strips 91 are spaced each from the next at positions along the edge leaving a space between the strips 91. As described above, the strips 91 are of greater hardness than the strips 92 and than the body between the strips 91 as in FIG. 11. In the embodiment of FIG. 11, again the same laser can be used in the spaces simply for cutting the pockets 93.

The invention claimed is:

1. A blade for mounting on a rotor of a cutting machine for cutting vegetation, the blade comprising:
   a blade member comprising a first base material;
   at least one cutting edge on the blade member;
   side by side strips of cladding material applied to the blade member so as to extend from a position at the cutting edge in a direction transverse to the cutting edge;
   wherein the applied cladding material of said side by side strips is of a greater hardness than the first base material;
   and wherein at least one of the strips of the applied cladding material has greater resistance to wear than at least one of others of the strips of applied cladding material.

2. The blade according to claim 1 wherein the greater resistance to wear of said at least one of the strips is provided by applying said cladding material in greater thickness.

3. The blade according to claim 1 wherein the greater resistance to wear of said at least one of the strips is provided by applying said cladding material of greater hardness.

4. The blade according to claim 1 wherein the strips of cladding material are parallel and have side edges of each strip immediately adjacent a side edge of a next adjacent strip so that no part of the base material is exposed at the edge.

5. The blade according to claim 1 wherein the strips of cladding material are alternate parallel beads.

6. The blade according to claim 1 wherein the blade member has one flat surface and one chamfered surface converging toward the flat surface at the cutting edge and the strips of cladding material are applied on the flat surface.

7. The blade according to claim 6 wherein the chamfered surface is flat.

8. The blade according to claim 6 wherein the chamfered surface is serrated and the strips are parallel to the serrations.

9. The blade according to claim 1 wherein each of the strips of cladding material comprises a bead of material which is fused to the base material by laser heating.

10. The blade according to claim 1 wherein an angle of the strips of cladding material to the cutting edge is in the range 45 to 75 degrees.

11. The blade according to claim 1 wherein an outer end portion of the blade is clad with cladding material of greater wear resistance than said at least one of others of the strips of applied cladding material.

12. The blade according to claim 1 wherein the strips of cladding material are longer at an outer end portion of the blade member than at a position spaced from the outer end portion of the blade member.

13. The blade according to claim 1 wherein a portion of said at least one of others of the strips of applied cladding material at the edge is removed by application of heat energy to form a recessed pocket at the edge with a series of the recessed pockets along the edge defining a serrated edge.

14. A blade for mounting on a rotor of a cutting machine for cutting vegetation, the blade comprising:
 a blade member comprising a first base material;
 at least one cutting edge on the blade member;
 side by side strips of cladding material applied to the blade member so as to extend from a position at the cutting edge in a direction transverse to the cutting edge;
 wherein the applied cladding material is of a greater hardness than the first base material;
 wherein at least one of the strips of applied cladding material has greater resistance to wear than at least one of others of the strips of applied cladding material;
 wherein the greater resistance to wear of said at least one of the strips is provided by applying said applied cladding material in greater thickness;
 and wherein an outer end portion of the blade is clad with cladding material of greater thickness than said at least one of others of the strips of applied cladding material.

15. The blade according to claim 14 wherein the strips of cladding material are parallel and have side edges of each strip immediately adjacent a side edge of a next adjacent strip so that no part of the base material is exposed at the edge.

16. The blade according to claim 15 wherein the cladding materials are alternate parallel beads.

17. The blade according to claim 14 wherein the blade member has one flat surface and one chamfered surface converging toward the flat surface at the cutting edge and the strips of cladding material are applied on the flat surface.

18. The blade according to claim 17 wherein the chamfered surface is flat.

19. The blade according to claim 17 wherein each of the strips of cladding material comprises a bead of material which is fused to the base material by laser heating.

20. The blade according to claim 17 wherein a portion of said at least one of others of the strips of applied cladding material at the edge is removed by application of heat energy to form a recessed pocket at the edge with a series of the recessed pockets along the edge defining a serrated edge.

21. A blade for mounting on a rotor of a cutting machine for cutting vegetation, the blade comprising:
 a blade member comprising a first base material;
 at least one cutting edge on the blade member;
 side by side strips of cladding material applied to the blade member so as to extend from a position at the cutting edge in a direction transverse to the cutting edge;
 wherein the cladding material is of a greater hardness than the first base material;
 and wherein at least one of the strips of cladding material has greater resistance to wear than at least one of others of the strips of applied cladding material;
 wherein the greater resistance to wear of said at least one of the strips is provided by applying said applied cladding material in greater thickness;
 and wherein a portion of said at least one of others of the strips of applied cladding material at the edge is removed by application of heat energy to form a recessed pocket at the edge with a series of the pockets along the edge defining a serrated edge.

* * * * *